March 31, 1925.  1,532,075

C. L. POOLE

TRACTIVE WHEEL

Filed Dec. 13, 1921    2 Sheets-Sheet 1

INVENTOR
C. L. POOLE
BY
ATTORNEYS

March 31, 1925.

C. L. POOLE

TRACTIVE WHEEL

Filed Dec. 13, 1921

INVENTOR
C. L. POOLE
BY
ATTORNEYS

Patented Mar. 31, 1925.

1,532,075

UNITED STATES PATENT OFFICE.

CLARENCE LEE POOLE, OF PONTIAC, MICHIGAN.

TRACTIVE WHEEL.

Application filed December 13, 1921. Serial No. 522,112.

*To all whom it may concern:*

Be it known that I, CLARENCE LEE POOLE, a citizen of the United States, and resident of Pontiac, in the county of Oakland and State of Michigan, have invented a new and Improved Tractive Wheel, of which the following is a full, clear, and exact description.

My invention relates to a tractive or bull wheel, which is primarily adapted for use in connection with tractors and similar types of vehicles.

It is a well appreciated fact that vehicles which are used to traverse a rough surface, as in the case of tractors, etc., present considerable difficulty. More particularly it has been noted, that a tractor, having a plurality of driving wheels, although operating efficiently on a fairly even surface, and while advancing along a substantially straight line, will not operate in a satisfactory manner when traversing an extremely rough surface or when turning in a circle.

This latter defect is to be attributed to the fact that the tractive wheels will travel in courses of varying acuteness, and due to the action of the differential there will be a loss of power. To overcome this defect it has been suggested that a single tractive or bull wheel be utilized, but the direction of movement of this wheel has had to be changed by main force, and also that when the wheel was moved out of a straight line slippage occurred, resulting in a loss of tractive power.

Thus it is an object of my invention to provide a tractive wheel adapted for use in connection with any type of vehicle, but particularly intended to be associated with vehicles of the tractor class, and by means of which a vehicle will be capable of traversing a relatively uneven ground without difficulty, and without danger of tipping.

A further object of my invention is the construction of a device of the character stated which after moving over obstacles, or an uneven surface, will right itself automatically, and without the necessity of the operator giving this device his constant attention.

Still another object of this invention is the provision of a wheel which may be substituted for the two driving wheels now commonly used, in connection with tractors, and which when utilized will permit of the elimination of the differential or compensating axle, aside from the fact that the said wheel will enable the vehicle to follow a circular course.

Among further objects of this invention are the construction of a tractive wheel which when utilized in connection with a vehicle will enable the latter to have an extremely short turning radius, the wheel being capable of having incorporated with it, a power unit which will thus provide a heavy propelling wheel; and Other objects of this invention will become apparent in the annexed specification taken in connection with the drawings, which latter illustrate one practical embodiment thereof, and in which.

Figure 1:
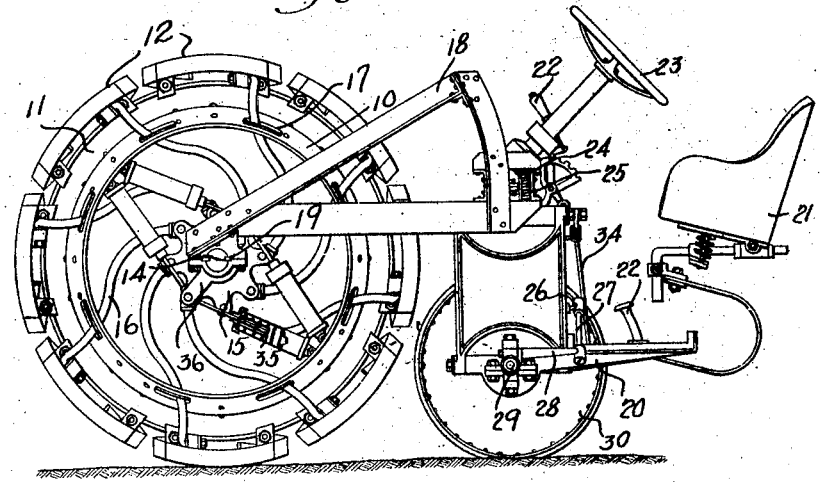
Figure 1 is a side elevation of a tractive wheel embodying my improved construction and showing the same associated with an operators seat and supplementary steering wheels.

The essence of my invention consists in the provision of a wheel of the type specified, which will in normal travel assume a cylindrical shape, but when negotiating a turn will assume a conical shape.

Thus as in Figure 4 it will be seen that the reference numeral 10 indicates the body of the wheel which is preferably in the form of a pair of truncated cones having a common base, it being noted that an annular rib in the form of a rail 11 is interposed between the base portions of these cones, and serves a purpose hereinafter specified.

With a view of providing a tread for the body of the wheel, I utilize panels or sections 12, and it will be noted in the embodiment illustrated, that these panels are hexagonal. Each tread section has the outer surface thereof convexly curved transversely thereof. Also it will be seen that the rail 11 serves as a mounting for these panels in that the same are pivotally associated with the said rail at points preferably intermediate their extremities, as has been indicated at 13.

Figure 3:
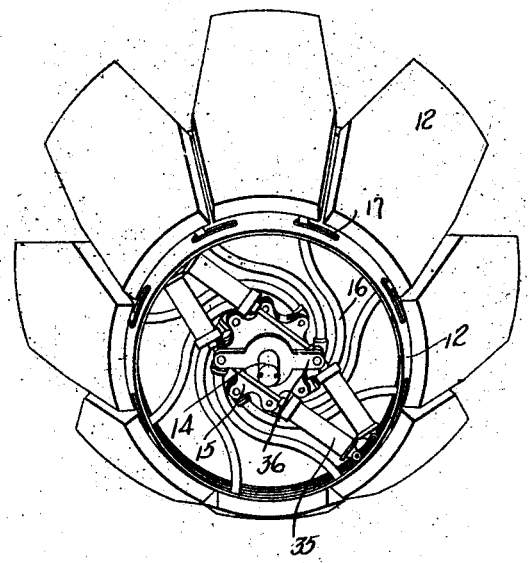
Figure 3 is a side elevation of the said wheel showing the same detached.
Figure 4:
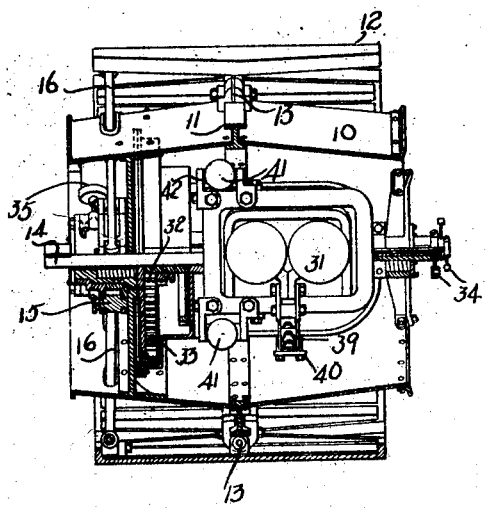
Figure 4 is a transverse sectional view of the said wheel.

Thus assuming that the rail is revolved around its axis, as in Figure 4, and that the latter is retained in a horizontal plane, it will be appreciated that the panels will each remain in a substantially horizontal plane. However, if the body 10 is inclined as in Figures 2 and 3, the panels will swing so as to present a virtually unbroken tread surface extending from their adjacent outer extremities to the rail 11.

Also a shaft 14 extends through the body 10, and this shaft serves as an axle for the wheel, and with a view of synchronizing the movement of all of the panels, a spider or hub 15 is associated with the said shaft, and carries a number of arms 16, which arms have one of their ends pivotally attached to the spider, their bodies extending through slots 17 in the periphery of the body 10, their opposite ends being pivotally connected to the under side of the panels 12. It will be seen from the foregoing that if one of the panels is swung inwardly that this motion will result in an inward push upon the arm 16 associated with this panel, in turn causing a rotation of the spider 15 around the shaft 14, and consequently causing all of the other arms to be retracted, thus swinging all of the panels to a position corresponding to that of the first mentioned panel.

The foregoing constitutes the essence of my invention, and numerous departures in construction may readily be resorted to. However in the embodiment illustrated, it will be noted that a rigid yoke 18 is provided, the arms of which are keyed to the shafts 14, as at 19. Also the chassis 20 which mounts the driver's seat 21, and controls 22 carries a steering wheel 23. This wheel when rotated, serves to revolve a gear 24 which meshes with an arcuate rack 25, the latter being fixedly secured to the body of the yoke 18, and extending between the links 26 which have their upper ends pivotally connected to the yoke, their lower ends being attached to the chassis 20.

Figure 2:
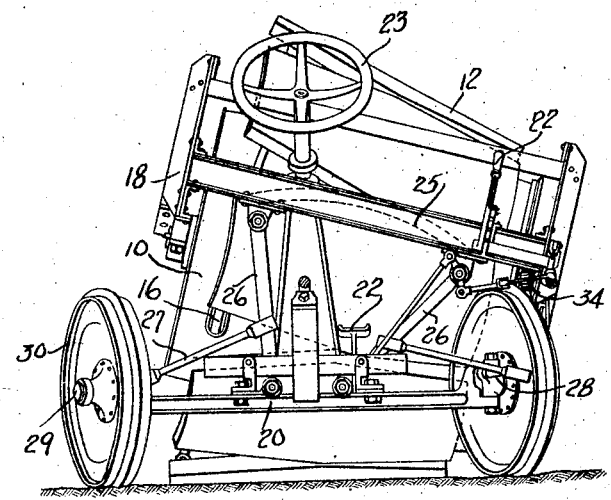
Figure 2 is a rear view thereof.

Thus upon the steering wheel 23 being rotated it will be obvious, assuming that the axle remains in a relatively fixed plane, that incident to the resultant movement of the rack 25, the yoke 18 will be tilted, as has been shown in Figure 2, and incident to the rigid construction of this yoke, the shaft 14 and consequently the body of the wheel will also be tilted, this operation immediately resulting in a swinging of the panels 12 in the manner aforedescribed.

Upon these panels swinging the circumference of one edge of the wheel will be constricted, while that of the opposite edge will be greatly enlarged, thus causing the wheel to follow a circular path upon its body being revolved around its axle.

It will be obvious that this action of the parts will result in a steering of the vehicle but with a view of providing an extremely short turning radius for the same, it will be noted that arms 27 have one of their ends attached to the links 26 while their opposite ends are secured to steering knuckles 28, the latter being provided with the conventional stub shafts 29 carrying wheels 30, of any suitable character. By this construction it will be obvious that the vehicle will be supported and steered at three points enabling the same to be turned in an extremely short radius.

It will further be noted in the embodiment illustrated, that a self-contained power unit is associated with the wheel, and this unit may be of any desirable type such as that which includes a motor 31, secured to the axle 14 and serving to drive a gear 32, which latter meshes with an internal gear 33 fixedly secured to the body 10, it being thus obvious that upon the motor 31 being operated that the latter, and the shaft 14 will be held from revolving by virtue of the connection 19 and thus the gear 32 will cause the gear 33, and consequently the body 10 carrying the panels to revolve around the motor. It is to be noted in this connection that the operation of the motor may be controlled from the driver's seat by means of the members 22 aforedescribed, the connection between these members and the throttle, spark, etc., being accomplished by any suitable type of linkage 34, as has been shown in Figure 1.

Figure 5:
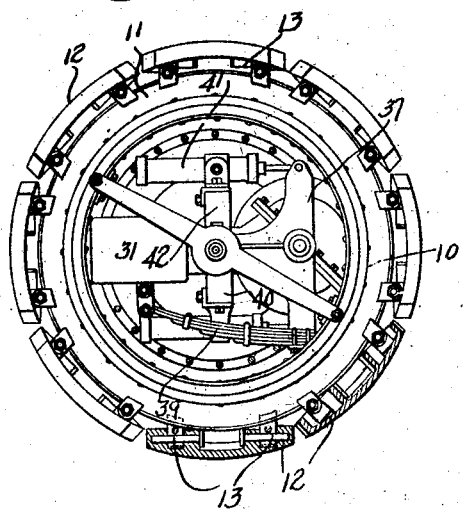
Figure 5 is a side elevation of the wheel.

Finally with a view of properly supporting the axle and motor with respect to the body of the wheel, attention is invited to Figures 1 and 3 in which it will be seen that members 35 in the nature of spring shock absorbers extend between the inner face of the body 10 and diametrically opposite arms 36, secured to the spider 15, rotatably carried by the axle 14. Thus it will be seen that the axle will have what might be termed a floating suspension so that any sudden shocks to which the body of the wheel might be subjected, will not be transmitted in full violence to the axle, and parts carried thereby. The members 35 also function as retractile springs and are arranged in sets of two spring members, the respective spring members of each set being pivotally connected at their inner ends with the arms 36 at points spaced approximately 180° apart and being attached at their outer ends to the body 10 at points spaced less than 180° apart. Balanced torques thus are exerted on the spider or hub 15 when the latter is in "normal" position, tending to hold the hub 15 against rotational movement about the axis of the shaft 14 independently of the body 10 and insuring the return of the hub to "normal" position when it has been rotated therefrom through the action of the arms 16. The hub is in "normal" position when the arms 16 carried thereby are in such positions that the respective tread sections to which the arms 16 are attached at their outer ends are disposed substantially parallel to the axis of rotation of the hub 15 and in the aggregate comprise a tread of substantially cylindrical form. I also term this last mentioned position of the thread sections 12 the "normal" position thereof and it therefore will be apparent that the thread sections 12 will be yieldingly held in normal position until moved therefrom by the application of an external force and that the tread sections will be returned instantly to "normal" position as soon as the external force has been removed. To further support the member 31 and to prevent the same being subjected to extremely rough usage it will be noted, as in Figures 4 and 5 that a T shaped brace 37 is fixedly carried by the axle 14 and primarily serves as a mounting for the crank shaft 38 of the said motor.

Having one of its ends connected to the cylinders, its opposite end being connected adjacent the outer end of one of the arms of the T shaped brace 37 is a quarter elliptic spring 39 and it will be obvious incident to the strain that this spring will serve as an additional support for the motor, and that the said spring will also serve to absorb shocks in a vertical plane, incident to the fact that the bridge 40 carried by the axle 14 engages said spring, it being further noted, that incident to this construction the spring will retain the gear 32 at all times in mesh with the gear 33. Having one of its ends secured adjacent the end of the second arm of said T shaped brace is a double acting spring element 41 which latter has its body pivotally carried by an extension 42 projecting in a direction opposite from the direction in which the bridge 40 extends.

Figure 6:
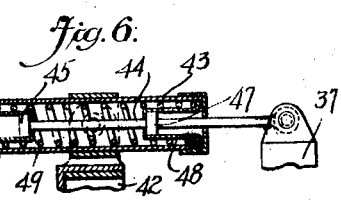
Figure 6 is an enlarged sectional view of a detail of construction.

The construction of this member is preferably such as has been shown in Figure 6, in which it will be noted that a casing 43 is provided through which a rod 44 slidably extends, one end of this rod carrying a head 45 in slidable engagement with a sleeve 46. A similar head 47 is associated with the body of the rod 44, and co-operates with a second sleeve 48 corresponding to the sleeve 46, and interposed between these two sleeves, and disposed within the casing 43 is a compression spring 49. Now assuming, as has been aforedescribed, that the rod 43 has its outer end connected to one of the arms of the brace 37, its body being pivotally supported by the element 42, it will be understood, that if the base moves with respect to the element 42, in such a manner, as to effect a projection of the rod 44, that the head 47 will slide freely within the sleeve 48, but the head 45 will engage the sleeve 46 and cause the latter to press the spring 49. If on the other hand, the brace 37 moves with respect to the element 42, to cause a retraction of the rod 44 the sleeve 45 will have free sliding engagement with the sleeve 46, and the sleeve 47 will cooperate with the sleeve 48 to move the latter, and to again compress the spring 49. Thus, regardless as to the fact that the rod is projected or retracted, the spring will be pressed, and this element will act as a shock absorber to cushion any sudden shocks which might be imparted to the parts of the motor by lateral movement. In other words, upon the tractive wheel encountering sudden obstacles, steep grades, or moving down sharp declines, etc. the member 41 will act to absorb any strains which would otherwise be passed along to the parts of the motor, and ultimately result in damage to the latter.

Thus it will be understood, that all of the objects set forth in the preamble of this specification are accomplished, in that it will be obvious that by means of my improved construction a wheel is capable of negotiating and pulling over a surface of extremely uneven character. Also the wheel itself may serve as the sole steering unit in which application it will be extremely effective, incident to the fact that the circumference of one side edge may be greatly increased or diminished, with respect to the second side edge automatically, and also at the will of the operator, it being further understood, that when the said wheel is coupled with an auxiliary steering apparatus, such as has been shown in the embodiment illustrated, the vehicle is capable of turning in an extremely short radius. Also a wheel of my improved type preferably embraces a self-contained power unit, and is of such relatively simply construction as to permit of its being manufactured at an extremely nominal figure. Further, it will be seen that incident to the fact that but a single wheel is necessary for steering purposes, and that this wheel assumes a conical shape, when tilted, that the differential or compensating axle may be dispensed with.

It will finally be appreciated that numerous modifications of structure might readily be resorted to without in the least departing from the scope of my claims, which are:

I claim:

1. A wheel including an annular body, a tread comprising a plurality of sections, each pivotally supported intermediate its ends on said body, a hub, and means connecting said tread sections to said hub and holding said tread and said hub continuously in concentric relation to each other while permitting limited relative rotational movements of said hub and tread.

2. In a wheel, an annular body, a tread comprising a plurality of similar sections, each pivotally supported intermediate its ends on said body, and means connecting said tread sections to one another in such manner as to permit the tread to be contracted at one of its ends and simultaneously expanded at the other end thereof.

3. In a wheel, an annular body, a tread comprising a plurality of similar sections, each pivotally supported intermediate its ends on said body, means connecting said tread sections to one another in such manner as to permit the tread to be contracted at one of its ends and simultaneously expanded at the other end thereof, and to hold said tread sections continuously in such positions in respect to one another as to comprise an annular tread at all times.

4. In a wheel, a tread comprising a plurality of separate sections, and means supporting said tread sections in such manner that the tread sections in the aggregate comprise an annual tread and all said sections are adapted to rock about axes lying in a single plane which intersects all of said tread sections midway between the opposite ends thereof.

5. In a wheel, a tread comprising a plurality of separate sections, and means supporting said tread sections in such manner that the tread sections in the aggregate comprise an annular tread and are adapted to rock about axes lying in a plane intersecting all of said tread sections midway between the opposite ends thereof, said supporting means normally holding said tread sections in such position that the circumference of the tread at one of its ends is approximately equal to the circumference of the tread at its other end, the supporting means permitting of rocking movement of the tread sections in unison to increase the circumference of the tread at one of its ends and to decrease the circumference of the tread at its other end.

6. In a wheel, a tread comprising a plurality of separate sections, and means supporting said tread sections in such manner that the tread sections in the aggregate comprise an annular tread and are adapted to rock about axes lying in a plane intersecting all of said tread sections midway between the opposite ends thereof, said supporting means normally holding said tread sections in such position that the circumference of the tread at one of its ends is approximately equal to the circumference of the tread at its other end, the supporting means permitting of rocking movement of the tread sections in unison to increase the circumference of the tread at one of its ends and to correspondingly decrease the circumference of the tread at its other end.

7. In a wheel, a rigid annual body, a tread comprising a plurality of sections, each pivotally supported intermediate its ends on the body in spaced relation to the outer peripheral surface of the body, a hub, an arm for each tread section, each arm being pivotally attached at its inner end to said hub and being flexibly connected at its outer end to a tread section, at a point lateral of the pivotal connection of the latter with the body, said arms being of greater length than the radial distance between said tread sections and the hub, and yieldable elastic means connecting said body and said hub and tending to prevent relative rotational movement of the body and the hub.

8. In a wheel, a rigid annular body, a tread comprising a plurality of sections, each pivotally supported intermediate its ends on the body in spaced relation to the outer peripheral surface of the body, a hub, an arm for each tread section, each arm being pivotally attached at its inner end to said hub and being flexibly connected at its outer end to a tread section, at a point lateral of the pivotal connection of the latter with the body, said arms being of greater length than the radial distance between said tread sections and the hub, a set of two spring devices connecting said body and said hub, said spring devices exerting equal torques on the hub in opposition to each other when said arms are in such position that said tread sections are held in substantially parallel relation to the axis of rotation of the hub and exerting unequal torques on said hub when the arms are in any other position.

9. In a wheel, a rigid annular body, a tread comprising a plurality of sections, each pivotally supported intermediate its ends on the body in spaced relation to the outer peripheral surface of the body, a hub, an arm for each tread section, each arm being pivotally attached at its inner end to said hub and being flexibly connected at its outer end to a tread section, at a point lateral of the pivotal connection of the latter with the body, said arms being of greater length than the radial distance between said tread sections and the hub, a set of two spring devices connecting said body and said hub, a source of power supporting between said hub and said body, and a driving connection between said source of power and said body, whereby a torque may be imparted to the latter.

10. In a wheel, a tread adapted to have the circumference thereof contracted regularly at one end and expanded regularly at its other end, as and for the purpose described.

11. In a wheel, a tread substantially circular in cross sectional contour and normally uniform in diameter throughout its length, said tread being capable of regular expansion of the circumference thereof at one end and of simultaneous regular contraction of the circumference thereof at its other end, as and for the purpose described.

12. In a wheel, a tread substantially circular in cross sectional contour and normally uniform in diameter throughout its length, said tread being capable of radial expansion at one end and of simultaneous radial contraction at its other end, while remaining circular in cross sectional contour at any point along its length.

13. In a wheel, an annular tread supported along a line coinciding with a circle located midway between the ends of the tread, the circumference of said tread at one of its ends normally being equal to the circumference of the tread at its other end and said tread being adapted to be expanded regularly from said line of support to one of its ends and contracted regularly from said line of support to its opposite end.

14. In a wheel, a tread comprising a plurality of segmental sections arranged in the form of an annulus, said sections being pivotally supported intermediate their ends along a line coincident with a circle located midway between the ends of the tread, and means connecting said sections together in such manner that said tread will assume a substantially cylindrical shape so long as the radial pressures on said sections at opposite sides of said line of pivotal support are equal and will assume a substantially frusto-conical shape when the radial pressures on any one of said sections at opposite sides of said line of pivotal support are unequal.

15. In a wheel, a substantially annular tread comprising a plurality of segmental sections connected together as to present a practically continuous tread surface and normally to have substantially the same circumference along its entire length, said tread being adapted to change in shape in response to unequal pressures at different points along its length to vary the circumference thereof at different points along its length.

CLARENCE LEE POOLE.